No. 655,187. Patented Aug. 7, 1900.
S. J. M. BERTHET.
BOILER TUBE PLUG.
(Application filed May 8, 1900.)

(No Model.)

WITNESSES:
Ella L. Giles
Otto Munk

INVENTOR
Stephane Jean Marie Berthet
BY
Richardson
ATTORNEYS

THE NORRIS PETERS CO., PHOTO-LITHO., WASHINGTON, D. C.

UNITED STATES PATENT OFFICE.

STÉPHANE JEAN MARIE BERTHET, OF SANNOIS, FRANCE.

BOILER-TUBE PLUG.

SPECIFICATION forming part of Letters Patent No. 655,187, dated August 7, 1900.

Application filed May 8, 1900. Serial No. 15,910. (No model.)

*To all whom it may concern:*

Be it known that I, STÉPHANE JEAN MARIE BERTHET, engineer, of Sannois, department of Seine-et-Oise, France, have invented a certain new and useful Boiler-Tube Plug, of which the following is a full, clear, and exact description.

This invention relates to a device for stopping or closing tubes, particularly applicable to the plugging of boiler-tubes known as "water-tube" boilers, allowing the closing, as also the subsequent opening, of such tubes to be effected with certainty and rapidity.

Figure 1:
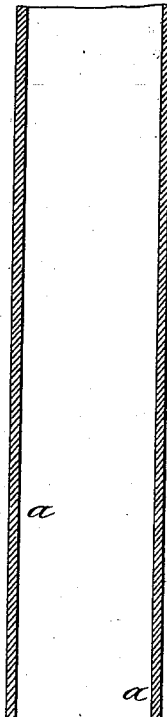
Figure 2:
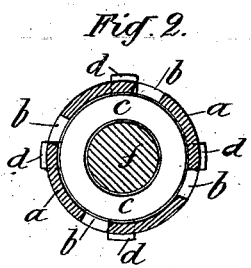
Figure 3:
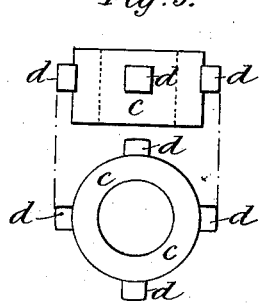
Figure 4:
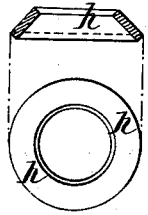
Figure 5:
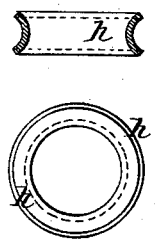
Figure 6:
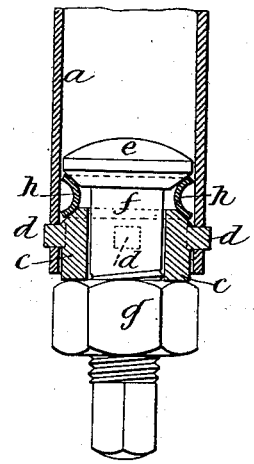

Referring to the annexed drawings, Figure 1 shows in longitudinal section a tube plugged at one of its ends by means of my invention. Fig. 2 is a cross-section on line 2 2 of Fig. 1. Fig. 3 shows in front and side elevation one of the closing devices. Fig. 4 shows in front and side elevation a washer of ductile metal. Fig. 5 shows similarly an analogous washer in a modified form. Fig. 6 is a longitudinal section similar to Fig. 1, showing a tube closed by means of the washer illustrated in Fig. 5.

To plug or close the end of a tube according to my invention, such tube $a$ must at its extremity be provided with a series of slots $b\ b\ b$, divided out circularly near the end. The device for effecting the closing consists of three parts.

First. A ring $c$, which can adjust itself freely in the tube $a$ at its end. Such ring is furnished exteriorly with arms $d\ d$ of a sufficient size to fit snugly in the slots $b\ b$ of the tube $a$, so that this ring is held therein in a manner similar to the well-known bayonet-socket joint.

Second. A bolt whose head $e$ is of a diameter slightly less than that of the tube $a$, so as to be able to enter the same freely. The stem $f$ is of a diameter corresponding with that of the opening in the ring $c$. This bolt is furnished with a nut $g$.

Third. A washer $h$, of ductile metal, such as copper—red copper, for instance—assuming the form of a truncated cone or a similar form. Its outer and inner diameters are such that it can be engaged freely by the tube $a$ on the one hand and by the stem of the bolt $e$ on the other.

To perform the plugging of the tube, the bolt without its nut is first inserted. Then the washer of ductile metal $h$ is slipped in, the base of the cone being turned toward the opening of the tube $a$. The ring $c$ is afterward fitted, its arms engaging the slots in the tube, and it being rotated for the small fraction of a turn sufficient to cause it to be retained in place. Finally, the nut $g$ is screwed on the bolt, and upon tightening up the said nut the head of the bolt is drawn outwardly and meets the ring $c$, energetically compressing the washer against the latter. The washer $h$ is thus slightly deformed under the force of the pressure to which it is subjected and insures tightness in a perfect manner.

I do not limit myself strictly to the beforementioned shape of the ductile washer, which, indeed, can be varied in several ways. One modification I have shown on Fig. 5. The ductile washer in this figure is of the shape of an annular ring of perceptibly semicircular section. Fig. 6 shows in longitudinal section a tube stopped or plugged by means of such a ring. In this case the head $e$ of the bolt $f$ is of the shape shown on the drawings.

I may modify the plug or closing device above described in various ways without departing from the spirit of my invention. Thus the ductile-metal washer can be constructed of a truncated-cone shape or in any other shape which will adapt itself to the conditions required, and the arrangement for holding the ring in the tube may comprise any number of slots in the tube and a corresponding number of projections from the ring.

Having thus described my invention, what I claim as such, and desire to secure by Letters Patent, is—

1. The combination with a tube, of a plug having an opening therethrough adapted to be rigidly secured in the end of the tube, a bolt passing freely through the opening in the plug, a head on the bolt within the tube, a nut threaded on the shank of the bolt having a bearing on the outside of the plug and a compressible washer comprising a thin ring interposed between the bolt-head and plug, the edge of said ring being pressed against the tube on the compression thereof, substantially as described.

2. In a plug or closing device for tubes, the combination of bayonet-slots in the ends of the tube, of an inner ring having projections which enter the said slots, of a bolt passing through said ring having a head bearing against a soft-metal washer of a conical or semicircular section so that upon drawing the head of the bolt outwardly by means of a nut upon its stem, the said washer is compressed and expanded outwardly forming a tight joint, substantially as described.

In testimony that I claim the foregoing as my invention I have signed my name in presence of two subscribing witnesses.

STÉPHANE JEAN MARIE BERTHET.

Witnesses:
GUSTAVE DUMONT,
EDWARD P. MACLEAN.